W. B. CLARK.
Improvement in Fly-Traps.
No. 131,848.
Patented Oct. 1, 1872.
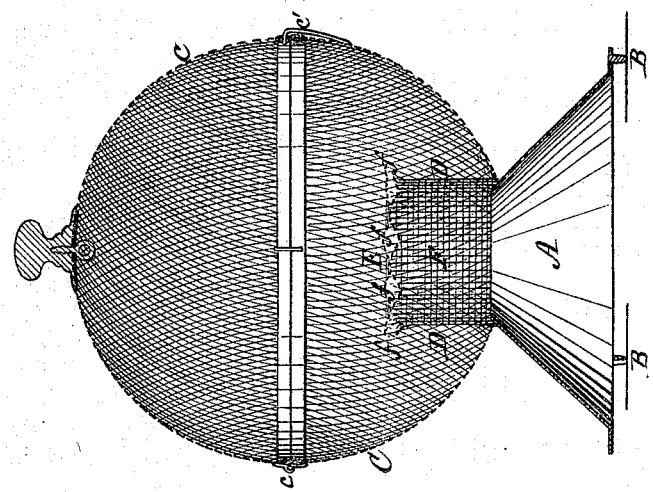
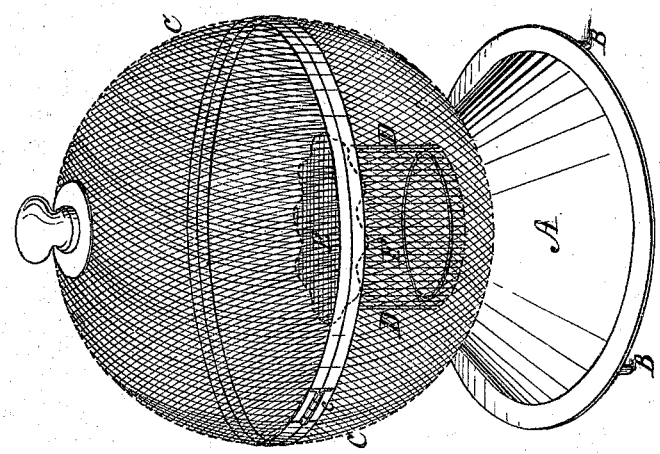
Witnesses.
Edmund Masson
John R. Young
Inventor.
W. B. Clark, by
Prindle and Roy his
Attys.

UNITED STATES PATENT OFFICE.

WILLARD B. CLARK, OF SOUTH BEND, INDIANA.

IMPROVEMENT IN FLY-TRAPS.

Specification forming part of Letters Patent No. 131,848, dated October 1, 1872.

*To all whom it may concern:*

Be it known that I, WILLARD B. CLARK, of South Bend, in the county of St. Joseph and in the State of Indiana, have invented certain new and useful Improvements in Fly-Traps; and do hereby declare that the following is a full, clear, and exact description thereof, reference being had to the accompanying drawing making a part of this specification, in which—

Figure 1 is a perspective view of my improved device, and Fig. 2 is a vertical central section of the same.

Letters of like name and kind refer to like parts in each of the figures.

The object of my invention is to furnish a simple, efficient, clean, and cheap means whereby flies may be trapped; and to this end said invention consists in the device as a whole, when its several parts are constructed and combined substantially as and for the purpose hereinafter specified.

In the annexed drawing, A represents the base, constructed of or from sheet metal, in the form of a truncated cone, and supported at three or more points by means of suitable legs B, which extend about one-fourth of an inch below the lower edge of said base. Secured to or upon the upper open end of the base is a spherical cage of wire-cloth, C, which is divided horizontally at its center, and the sections thus formed connected together by means of a suitable hinge, $c$, upon one side and a spring-catch, $c'$, upon the opposite side. Extending vertically upward from the upper end of the base A, within the cage C, is a hollow cylinder, D, constructed of or from wire-cloth, the upper end of which is inclosed by means of a disk, E, of the same material, except at two or more points, where the upper edge of said cylinder is bent downward and outward, so as to form small openings $f$, each of which has a sufficient size to permit of the passage of a fly or other similar insect from the chamber F.

The device is now complete, and is used as follows: Any suitable bait is placed upon a table and the trap placed directly over the same, so as to compel the flies to pass beneath the base before reaching said bait. From the bait the flies will naturally pass upward toward the light and enter the cage through the small openings $f$, where they will be most effectually trapped, it being contrary to the habits of such insects to pass from a light place into one comparatively dark, as would be the case if they should again find the openings $f$ and repass through the same into the base. When a sufficient quantity of flies are entrapped they may be killed by means of smoke or by dipping the trap in water, after which said flies may be removed and the trap cleansed by opening the wire cage.

The especial advantages possessed by this device are simplicity of construction, efficiency, cheapness, and such an arrangement of parts as to enable each portion to be quickly and easily cleansed.

Having thus fully set forth the nature and merits of my invention, what I claim as new is—

The hereinbefore-described device, consisting of the hollow, conical base A, the spherical horizontally-divided wire cage C, and the cylindrical compartment F provided with the openings $f$, when said parts are constructed and combined substantially as and for the purpose specified.

In testimony that I claim the foregoing I have hereunto set my hand this 13th day of August, 1872.

WILLARD B. CLARK.

Witnesses:
WILLIAM H. STANFIELD,
L. G. WELTON.